United States Patent
Mantor et al.

(10) Patent No.: US 8,316,252 B2
(45) Date of Patent: Nov. 20, 2012

(54) DISTRIBUTED CLOCK GATING WITH CENTRALIZED STATE MACHINE CONTROL

(75) Inventors: Michael J. Mantor, Orlando, FL (US); Tushar K. Shah, Orlando, FL (US); Donald P. Lee, Oviedo, FL (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1132 days.

(21) Appl. No.: 12/192,530

(22) Filed: Aug. 15, 2008

(65) Prior Publication Data

US 2009/0300388 A1 Dec. 3, 2009

Related U.S. Application Data (60) Provisional application No. 61/057,449, filed on May 30, 2008.

(51) Int. Cl.
 *G06F 1/00* (2006.01)
 *H04L 7/00* (2006.01)
(52) U.S. Cl. ......... 713/322; 713/323; 713/330; 713/401
(58) Field of Classification Search .......... 713/300–340, 713/400–401
 See application file for complete search history.

(56) References Cited

U.S. PATENT DOCUMENTS

| | | | | |
|---|---|---|---|---|
| RE33,004 | E * | 8/1989 | Kirby et al. ............ | 102/200 |
| 5,179,438 | A * | 1/1993 | Morimoto ............ | 348/536 |
| 5,378,950 | A * | 1/1995 | Takamoto et al. ........ | 327/401 |
| 5,477,479 | A * | 12/1995 | Ochi ................... | 708/630 |
| 5,655,124 | A * | 8/1997 | Lin .................... | 713/322 |
| 6,000,338 | A * | 12/1999 | Shann .................. | 102/217 |
| 6,005,421 | A * | 12/1999 | Saeki .................. | 327/119 |
| 6,167,528 | A * | 12/2000 | Arcoleo ............... | 713/501 |
| 6,212,645 | B1 * | 4/2001 | Tjandrasuwita ........ | 713/330 |
| 6,237,103 | B1 * | 5/2001 | Lam et al. ............ | 713/330 |
| 6,472,922 | B1 * | 10/2002 | Paluch et al. .......... | 327/291 |
| 6,621,882 | B2 * | 9/2003 | Denny et al. .......... | 375/371 |
| 7,039,819 | B1 * | 5/2006 | Kommrusch et al. .... | 713/322 |
| 7,337,342 | B1 * | 2/2008 | O'Brien ............... | 713/330 |
| 7,475,267 | B1 * | 1/2009 | Cocosel ............... | 713/330 |
| 7,529,958 | B2 * | 5/2009 | Roth et al. ............ | 713/330 |
| 7,600,136 | B2 * | 10/2009 | Cheng et al. .......... | 713/300 |
| 7,613,937 | B2 * | 11/2009 | Boyum et al. .......... | 713/300 |
| 7,617,403 | B2 * | 11/2009 | Capps et al. .......... | 713/300 |
| 7,685,439 | B2 * | 3/2010 | Drescher ............. | 713/300 |
| 7,984,317 | B2 * | 7/2011 | Conroy et al. ......... | 713/340 |
| 2005/0283624 | A1 * | 12/2005 | Kumar et al. .......... | 713/300 |
| 2009/0164821 | A1 * | 6/2009 | Drescher ............. | 713/323 |

\* cited by examiner

*Primary Examiner* — Paul R Myers
*Assistant Examiner* — Trisha Vu
(74) *Attorney, Agent, or Firm* — Sterne, Kessler, Goldstein & Fox, PLLC (57) ABSTRACT

A method, computer program product, and system are provided for controlling a clock distribution network. For example, an embodiment of the method can include programming a predetermined delay time into a plurality of processing elements and controlling an activation and de-activation of these processing elements in a sequence based on the predetermined delay time. The processing elements are located in a system incorporating the clock distribution network, where the predetermined delay time can be programmed in a control register of a clock gate control circuit residing in the processing element. Further, when controlling the activation and de-activation of the processing elements, this activity can be controlled with a state machine based on the system's mode of operation. In controlling the activation and de-activation of the processing elements, the method described above can not only control the effects of di/dt in the system but also shut off clock signals in the clock distribution network when idle, thus reducing dynamic power consumption.

27 Claims, 8 Drawing Sheets

Figure 1
(Conventional)

Figure 8

DISTRIBUTED CLOCK GATING WITH CENTRALIZED STATE MACHINE CONTROL

CROSS-REFERENCE TO RELATED APPLICATION

This application claims benefit of U.S. Provisional Application No. 61/057,449 (SKGF Ref. No. 1972.0720000), filed May 30, 2008, titled "Distributed Clock Gating with Centralized State Machine Control," which is incorporated herein by reference in its entirety.

BACKGROUND

1. Field of the Invention

The present invention relates generally to reducing dynamic power consumption in digital system designs.

2. Background

Clock signals are used to define a time reference for the movement of data within a synchronous digital system. A clock distribution network distributes clock signals from a common point in the system to elements in the system that require clock signals. Oftentimes, a significant amount of power can be wasted in clock transitions in these elements when an output of an element is not needed in the digital system. More specifically, a large amount of current is drawn from a system's power grid as transistors that control the clock signal switch states. These high current demands cause noise in the system due to voltage drops and inherent system inductance (L di/dt). Consequently, this noise can cause missed timings if the clock signal voltage is too low, or system failure if the clock signal voltage is too high.

A large amount of dynamic power is consumed when the digital system powers ON and OFF. More specifically, as the system is activated, the clock distribution network activates all of the system's clock signals, thus drawing a large amount of current at one time from the system's power grid. The instantaneous current drawn from the system's power grid due to switching ON of the clock distribution network may be referred to as a "di/dt" effect, which represents a change in current in the power grid over time. Conversely, as the clock distribution network de-activates, all of the system's clock signals shutdown, drawing a large amount of current as switching transistors in the clock signals transition from an active state to an idle state (e.g., transition from '1' to '0'). As the number of devices in the system grows, thus increasing the number of clock signals in the clock distribution network to control these additional devices, the susceptibility of missed timings and system failure becomes greater due to an increase in dynamic power when the system powers ON and OFF.

Accordingly, what is needed is a method to control the effects of di/dt as the clock distribution network is activated and de-activated and to shut off clock signals in the clock distribution network when idle, thus reducing dynamic power consumption.

SUMMARY

Embodiments of the invention include a method for controlling a clock distribution network in a digital system including a plurality of processing elements. The method includes programming a predetermined delay time into the plurality of processing elements and controlling activation and de-activation of the plurality of processing elements in a sequence based on the predetermined delay time. Further, the method can include verifying the predetermined delay time in each processing element. In the verifying step, a control register with the predetermined delay time can be read to ensure that the delay time value was programmed correctly.

In the programming step, the delay time can be programmed in a control register of a clock gate control circuit that resides in the processing element. Also, this step can include multiplying a delay multiplier with a base constant to calculate an effective activation time and a de-activation time for each processing element. The delay multiplier and the base constant can be stored in the control register of the processing element.

In the controlling step, a clock gate control circuit, in the processing element, can be enabled when the system is active. Conversely, the clock gate control circuit can be disabled when the system is idle. Further, this step can include controlling an activation and a de-activation of one or more processing elements with a state machine based on the system's mode of operation. The processing elements can be configured in a daisy-chain fashion, where the activation and de-activation of the processing elements occur in a sequential and staggered manner.

Embodiments of the invention additionally include a computer program product comprising a computer-usable medium having computer program logic recorded thereon for enabling a processor to control a clock distribution network in a digital system including a plurality of processing elements. The computer program logic includes computer readable program code that enables a processor to perform the following: program a predetermined delay time into the plurality of processing elements; and, control activation and de-activation of the plurality of processing elements in a sequence based on the predetermined delay time. The computer program logic can additionally include a computer readable program code that enables a processor to verify the predetermined delay time in each processing element.

Embodiments of the invention further include a system capable of controlling a clock distribution network in a digital system including a plurality of processing elements. The system includes a first module to program a predetermined delay time into the plurality of processing elements and a second module to control activation and de-activation of the plurality of processing elements in a sequence based on the predetermined delay time. Furthermore, the system can include a third module to verify the predetermined delay time in each processing element.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the relevant art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

A conventional method for controlling a clock distribution network applies clock gating techniques for local clock control. To save power, clock gating refers to an addition of control logic to a clock distribution network so that a portion of the network is disabled when idle.

Figure 1:
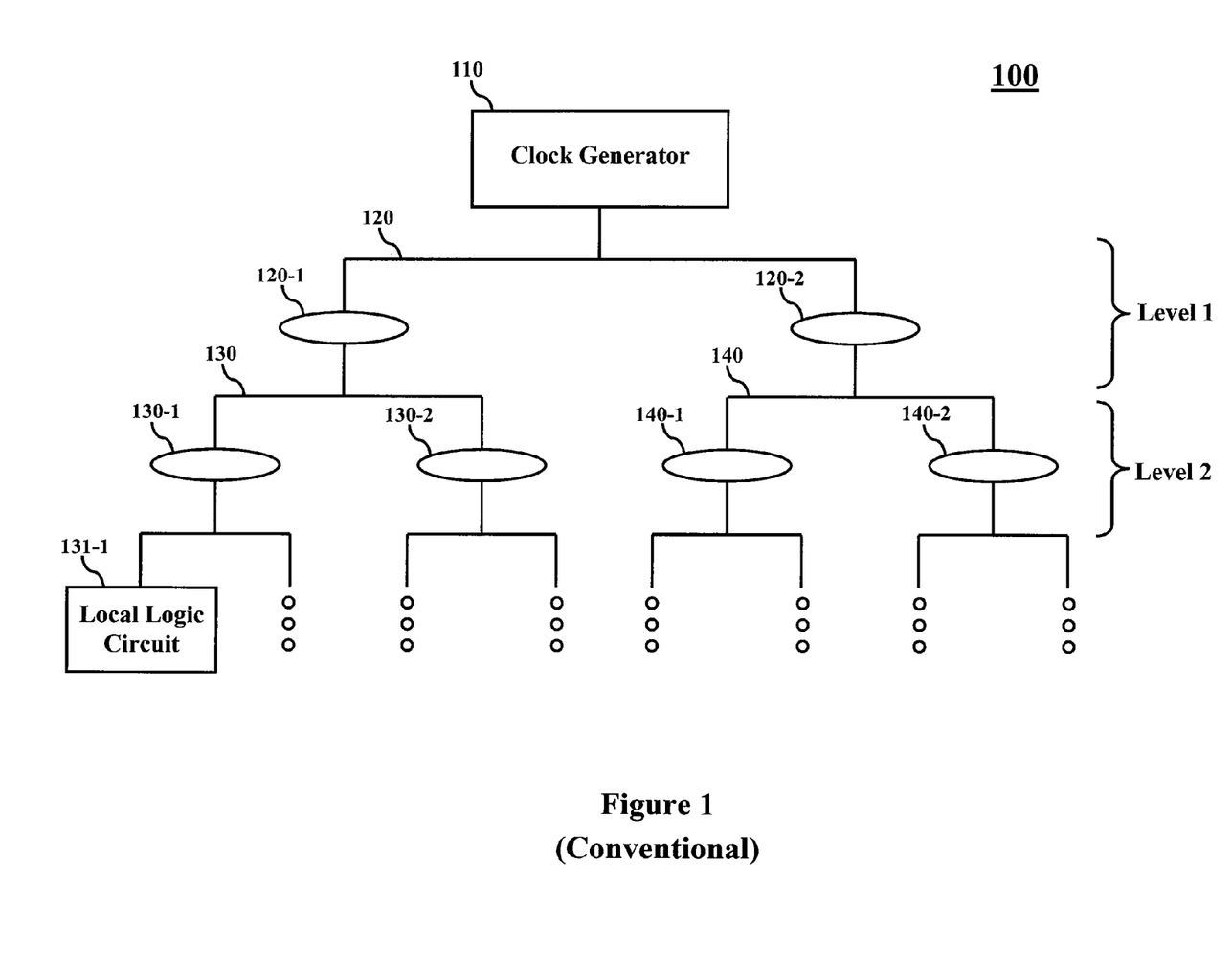
FIG. 1 is an illustration of an example clock tree to represent a clock distribution network.

FIG. 1 is an example clock tree 100, representative of a conventional clock distribution network. Conventional clock tree 100 includes a clock generator 110, a root level 120 (level 1) of the network, and a plurality of branches 130 and 140 (level 2) that stem from root level 120. A local clock control in clock tree 100 incorporates clock gate control circuits 120-1, 120-2, 130-1, 130-2, 140-1, and 140-2 to selectively propagate a signal from clock generator 110 to branches in clock tree 100. This clock tree configuration can be repeated for as many branches as necessary for the clock distribution network until the clock signal reaches a local logic circuit 131-1. Local logic circuit 131-1 can be a functional block or processing element in a system incorporating the clock distribution network. One or more local logic circuits can be coupled to each clock gate control circuit 120-1, 120-2, 130-1, 130-2, 140-1, and 140-2.

A drawback of conventional clock tree 100 is that as designs become more complex (e.g., the number of devices and clock branches in the clock distribution network grows), the clock tree structure consumes a significant amount of dynamic power. For example, physical interconnects (e.g., wires), between clock generator 110 and local logic circuits in the system (e.g., local logic circuit 131-1), and the local logic circuits themselves can consume over 30% of dynamic power when the system is in operation. This large amount of current is drawn from the system's power grid as interconnects dissipate power due to their resistive nature and transistors in local logic circuits switch states. Consequently, the effects of di/dt increase, which leads to an increased susceptibility of missed timings in the system and ultimately system failure.

As the amount of logic included on an electronic device grows, the clock tree structure described with respect to FIG. 1 can be inadequate to support these large-scale devices due to dynamic power constraints. A distributed clock gating system with a centralized state machine control is needed to overcome the drawbacks of the conventional clock tree structure.

A distributed clock gating system with the centralized state machine control essentially enables clock gate control circuits when a system is active and disables clock gate control circuits when the system is idle. Further, a distributed clock gating system with the centralized state machine control mitigates di/dt effects such that a heavy inrush of current can be avoided when processing elements in a design incorporating the distributed clock gating system powers ON or OFF simultaneously.

In the following description, for purposes of explanation, specific details are set forth to provide a thorough understanding of the present invention. It will be evident, however, to one skilled in the relevant art that the present invention can be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

Figure 2:
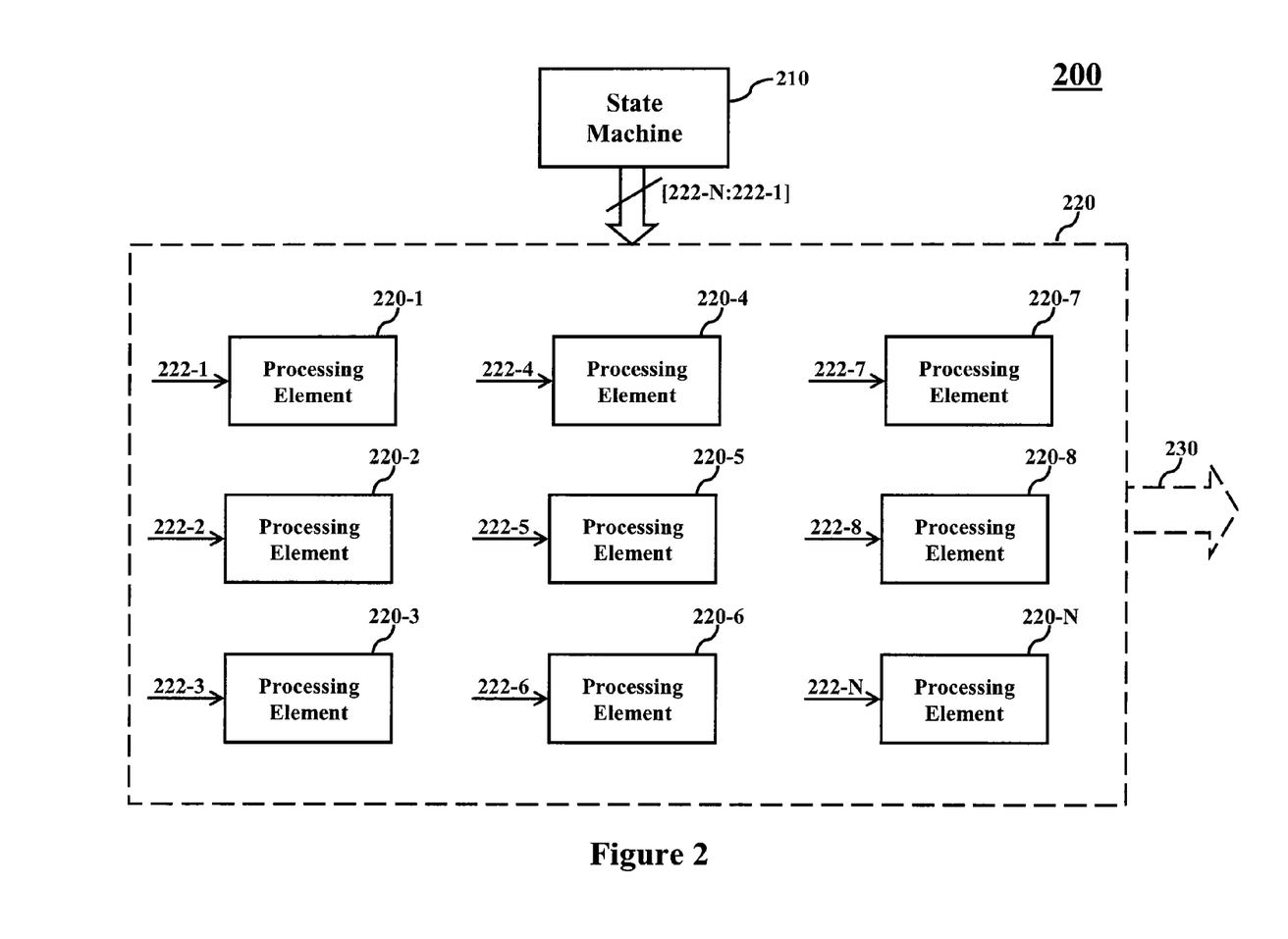
FIG. 2 is an illustration of an embodiment of an electronic system in which the present invention can be implemented.

FIG. 2 is an illustration of an embodiment of an electronic system 200 in which the present invention can be implemented. System 200 includes a state machine 210 and an array 220 of processing elements 220-1 to 220-N. Processing elements 220-1 to 220-N are interdependent elements that operate together to perform operations used by system 200 to generate an output 230. For example, processing elements 220-1 to 220-N can perform floating-point, graphics, or signal processing functions.

Each processing element can include a clock gate control bus of signals 222-1 to 222-N, where these signals are controlled by state machine 210. For instance, for a particular mode of operation, state machine 210 can enable clock gate control signals for the appropriate processing elements to perform the operation. Example modes of operation for state machine 210 include an ON operation, OFF operation, read operation, and program operation. An output 230 from array 220 can be used by other devices or arrays coupled to system 200. In the alternative, output 230 can be coupled to state machine 210 for further processing.

Figure 3:
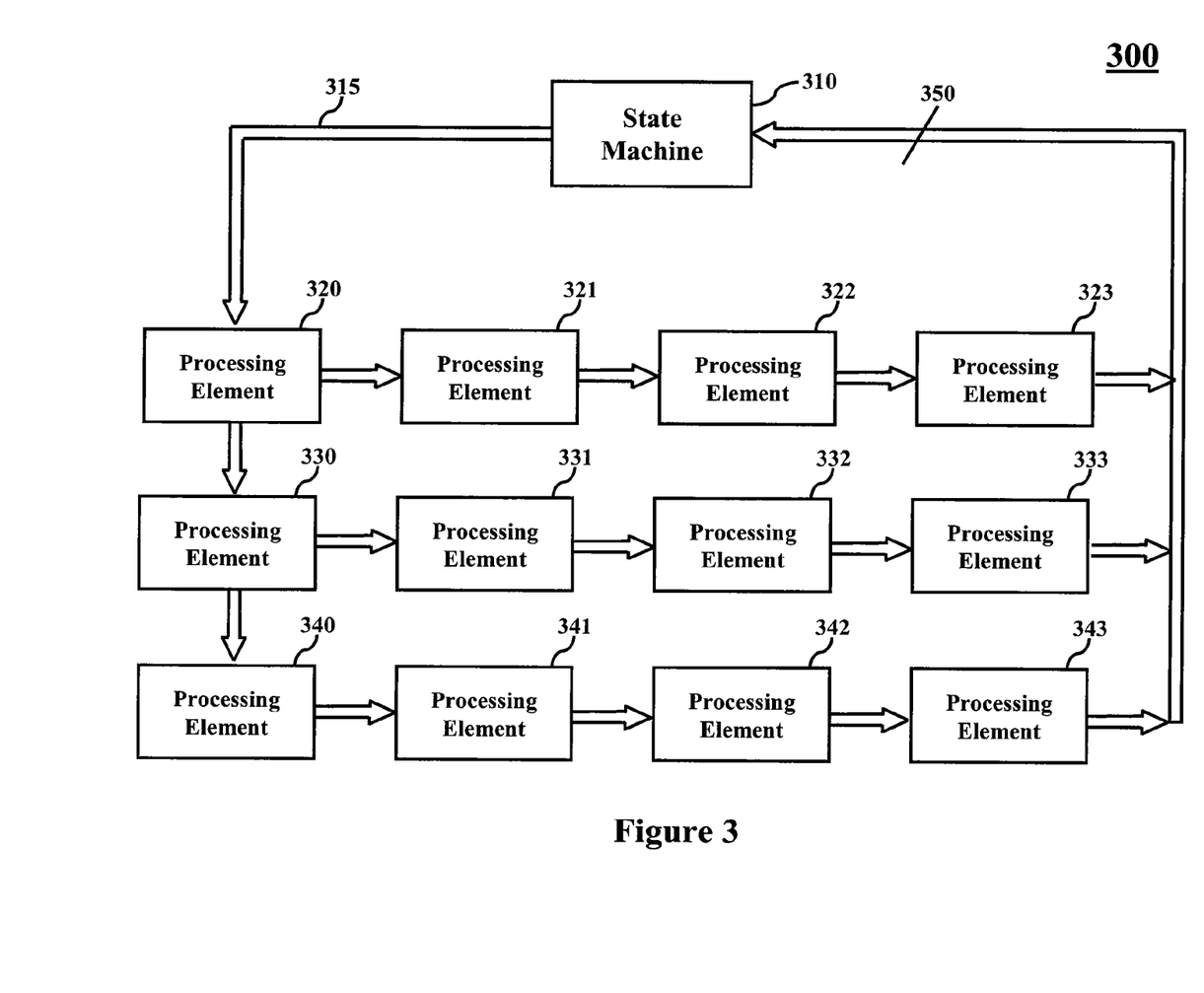
FIG. 3 is an illustration of an embodiment of an electronic system in which the present invention can be implemented, where processing elements are coupled to each other in a daisy-chain configuration.

FIG. 3 is an illustration of another embodiment of an electronic system 300 in which the present invention can be implemented. System 300 includes a state machine 310 and processing elements 320-323, 330-333, and 340-343.

In FIG. 3, processing elements 320-323 are interdependent element coupled to one another in a daisy-chain configuration, where an input bus 315 traverses through each processing element. State machine 310, via input bus 315, controls an activation and de-activation of processing elements 320-323. For example, state machine 310 can turn ON processing elements 320-323 by sending a control signal to these elements via bus 315. Processing elements 320-323, in turn, perform a particular function, where an output of processing element 320 can be transferred to processing element 321, an output of processing element 321 can be transferred to processing element 322, and so forth. Alternatively, state machine 310 can send control signals to turn ON a sub-set of processing elements 320-323 (e.g., processing elements 322 and 323) via bus 315, where these processing elements perform a particular function in response to the control signals. Processing elements 330-333 and 340-343 function in a similar manner as described above with respect to processing elements 320-323. Further, outputs from processing elements 323, 333, and 343 can be combined into a single bus 350 to be received by state machine 310 for further processing.

Figure 4:
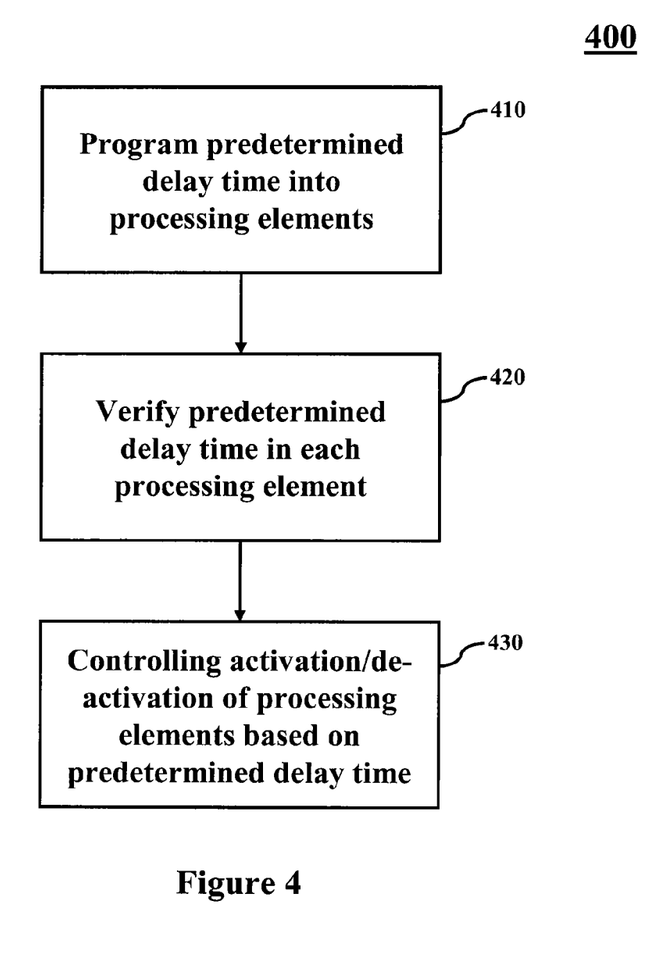
FIG. 4 is an illustration of an embodiment of a method for controlling a clock distribution network.

FIG. 4 is an illustration of an embodiment of a method 400 for controlling a clock distribution network in accordance with the present invention. Method 400 can occur, for example, using system 200 or system 300. In step 410, a predetermined delay time is programmed into a plurality of processing elements, where the processing elements are located in a system incorporating the clock distribution network. In one embodiment, the predetermined delay time can be programmed in a control register of the processing element. For example, in referring to FIG. 3, the control register can be a device (not shown) that resides in each processing element 321-323, 331-333, and 341-343 and controls the behavior of its respective processing element as understood by those persons skilled in the relevant art.

Figure 5:
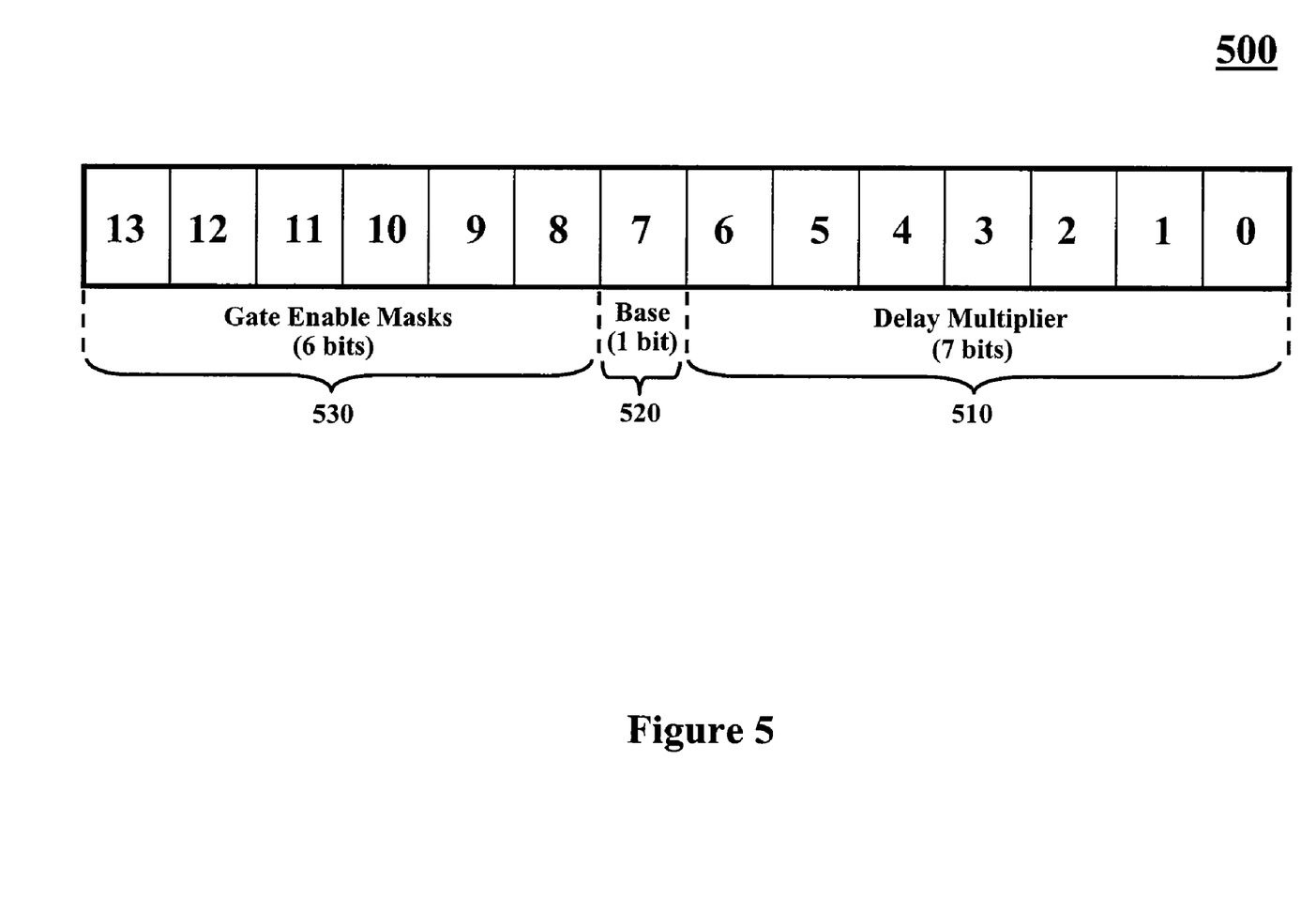
FIG. 5 is an illustration of an example control register that can be used as a device to store delay time information.

FIG. 5 is an illustration of an example control register 500 that can be used as a device to store delay time information in accordance with the present invention. Control register 500 includes 14 bits, where 7 bits represent a delay multiplier 510, 1 bit represents a base 520, and 6 bits represent a group of gate enable mask bits 530. In one embodiment, the bits in control register 500 can be programmed through microcode, as understood by those skilled in the relevant art.

The value of the predetermined delay time in step 410, of FIG. 4, is design-specific, which provides flexibility in the programming of delay times across system designs with various performance requirements. A multiplication of delay multiplier 510 and base 520 generates the predetermined delay time to be programmed into control register 500, where delay multiplier 510 represents a multiplication factor (e.g., the multiplication factor can be between a value of 0 and 64 since delay multiplier 510 is 6 bits) and base 520 represents a constant number for multiplication with delay multiplier 520.

For instance, if base 520 is a '0', then this might represent a constant multiplier of 8. On the other hand, if base 520 is a '1', this might represent a constant multiplier of 16. A person skilled in the relevant art will appreciate that bits 0-7 in control register 500—represented as delay multiplier 510 and base 520—can be used in a variety of ways to represent the predetermined delay time. Moreover, a person skilled in the relevant art will recognize that the bit-length of control register 500 is not limited to 14 bits and that the bit-length can be shorter or longer depending on system design.

A group of gate enable mask bits 530 can be used to enable a clock gate control circuit residing in the processing element based on a mode of operation of the system. The clock gate control circuit can be used to enable a clock circuit in a processing element (e.g., processing elements 320-323, 330-333, and 340-343 in FIG. 3). In light of the description of control register 500 above, a person skilled in the relevant will appreciate that each processing element in example electronic systems 200 and 300 in FIGS. 2 and 3, respectively, can be independently controlled during various modes of operation.

For instance, in referring to electronic system 300 in FIG. 3, each processing element can include a control register device (e.g., control register 500 in FIG. 5) to indicate whether a processing element turns ON during a particular mode of operation. Further, based on the information stored in the control register, processing elements can be programmed to turn ON in a sequential manner. For example, in a test mode of operation, a gate enable mask bit in a processing element's control register can indicate whether a particular processing element participates in the test mode (e.g., gate enable mask bit '13' programmed to HIGH). Delay multiplier bits (e.g., delay multiplier bits 510) and base bit (e.g., base bit 520) in the control registers of processing elements participating in the test mode can also indicate a delay time between an activation of processing elements. Delay time between an activation of two or more processing elements is described further below with respect to step 430.

A person skilled in the relevant art will recognize that delay multiplier bits, base bit, and gate enable mask bits in a control register can be programmed according to a mode of operation. Based on the programmed states of these bits, an electronic system (e.g., electronic system 200 or 300) can dynamically turn ON specific processing elements based on a mode of operation. In other words, based on the mode of operation, particular processing elements can be turned ON, while other processing elements are OFF, thus reducing overall power consumption in the electronic system.

Referring back to FIG. 4, in step 420, a state machine reads the programmed delay time value of each processing element to ensure that the values were programmed correctly. As described in one embodiment of step 410, the delay time information can be stored in a control register of the processing element. The state machine can read this control register and verify whether the delay time information is correct. Techniques for verifying data in control registers is known to those persons skilled in the relevant art. Further, in one embodiment, step 420 can be used as a test debug feature of the system incorporating the clock distribution network and, as such, cannot be used during normal modes of operation.

In step 430, an activation and de-activation of the plurality of processing elements are controlled in a sequence based on the predetermined delay time programmed in each processing element. For example, a plurality of processing elements can be activated in a sequential manner based on a programmed delay time in each processing element's control register. In one embodiment, the processing elements can be activated by enabling clock gate control circuit in each processing element. Conversely, the processing elements can be de-activated by disabling the clock gate control circuits.

For ease of explanation, step 430 will be described with respect to system 300 in FIG. 3. A person skilled in the relevant art will appreciate that system 200 in FIG. 2 or an alternate system configuration can be used. These alternate system configurations are within the scope and spirit of the present invention.

For example, in referring to FIG. 3, processing element 321 can be programmed with a delay time of 30 cycles, processing element 322 can be programmed with a delay time of 60 cycles, and processing element 323 can be programmed with a delay time of 90 cycles. In an example, one cycle can equate to 10 ns, where the timing of the cycle is design-specific and can be based on a clock frequency of a system implementing method 400. As state machine 310 issues a control signal (e.g., a signal indicating an ON mode of operation in system 300), processing element 320 receives the control signal and propagates it to processing element 321. As soon as the control signal is received by processing element 321, processing element 321 propagates the control signal to processing element 322 and so forth to processing element 323. Due to the programmed delay times in each processing element, processing element 321 will activate its clock gate control signal after 30 cycles of receiving the control signal and, after another 30 cycles, processing element 322 will activate its clock gate control signal, followed by processing element 323 30 cycles later.

Due to the staggered nature of the activation times for processing elements 320-323, the dynamic power consumption from these processing elements is less than if processing elements 320-223 were activated simultaneously. In particular, as processing element 320 is activated, the clock circuits in this element consumes dynamic power from the system's power grid at a fraction of the dynamic power from the clock circuits of all four processing elements 320-323 activating simultaneously.

In addition, in staggering the activation time for processing element 321 30 cycles after the activation time for processing element 320, the power grid of system 300 is given a period of time to recover from the dynamic power consumed by the clock circuits in processing element 320. Likewise, the power grid is given a period of time to recover from the dynamic power consumed by the clock circuits in processing element 321 before the clock circuits in processing element 322 are activated. A large amount of current is not drawn from the power grid at one time due to the sequential and staggered nature of activation times for the clock circuits in processing elements 320-323, thus reducing the effects of di/dt and the susceptibility of missed timings in the system as well as system failure.

Similar to the staggered nature of the activation time for the clock circuits in processing elements 320-323, the de-activation of system 300 behaves in a similar manner. In particular, as state machine 310 issues a control signal (e.g., a signal indicating an OFF mode of operation in system 300), processing element 320 receives the control signal and propagates it to processing elements 321-323 in the same manner as described above with respect to the ON mode of operation. Due to the programmed delay times in each processing element, processing element 321 will de-activate its clock circuits 30 cycles after receiving the control signal and, after another 30 cycles, processing element 322 will de-activate its clock circuits, followed by processing element 323 30 cycles later. As a result of the sequential and staggered nature of the de-activation times for the clock signals in processing elements 320-323, as described herein, a large amount of current is not drawn from the power grid at one time when switching transistors in the clock circuits transition from an active state to an idle state (e.g., transition from '1' to '0').

Figure 6:
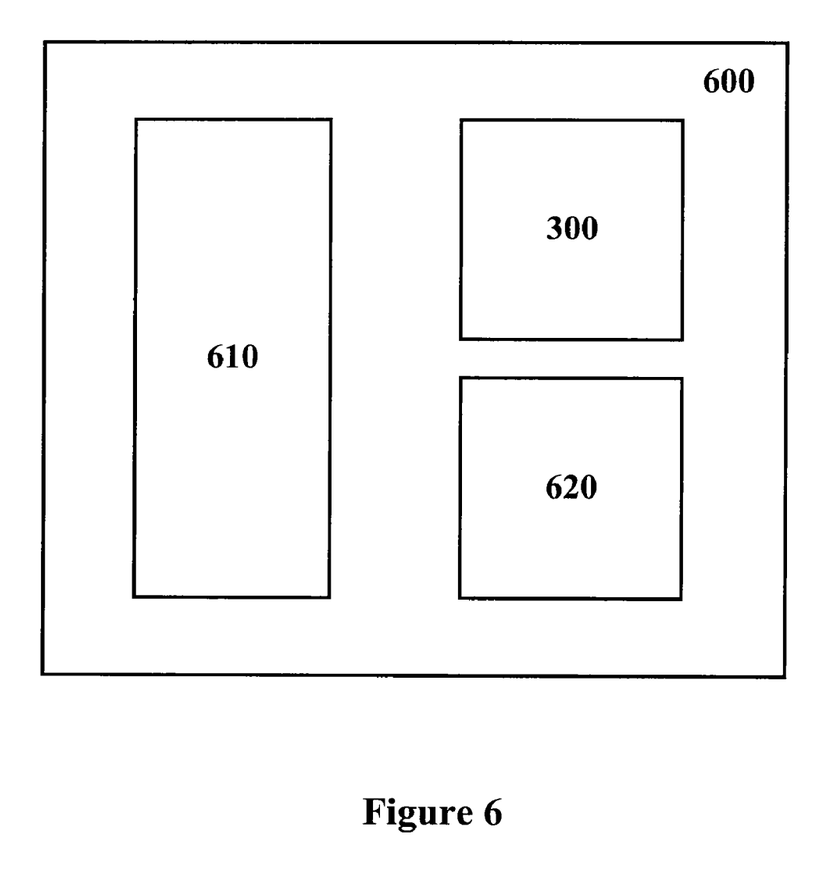
FIG. 6 is an illustration of an example system design incorporating an embodiment of an electronic system in which the present invention can be implemented.

To provide a high-level example of the characteristics of step 430 in a system design, it will be assumed, for example purposes, that system 300 is part of a larger design system 600 and that system 300 performs a particular function in system 600. For example, as illustrated in FIG. 6, system 600 can be a graphics chip with an input buffer 610, system 300, and output buffer 620. In this graphics chip example, system 300 can perform a graphics operation.

Figure 7:
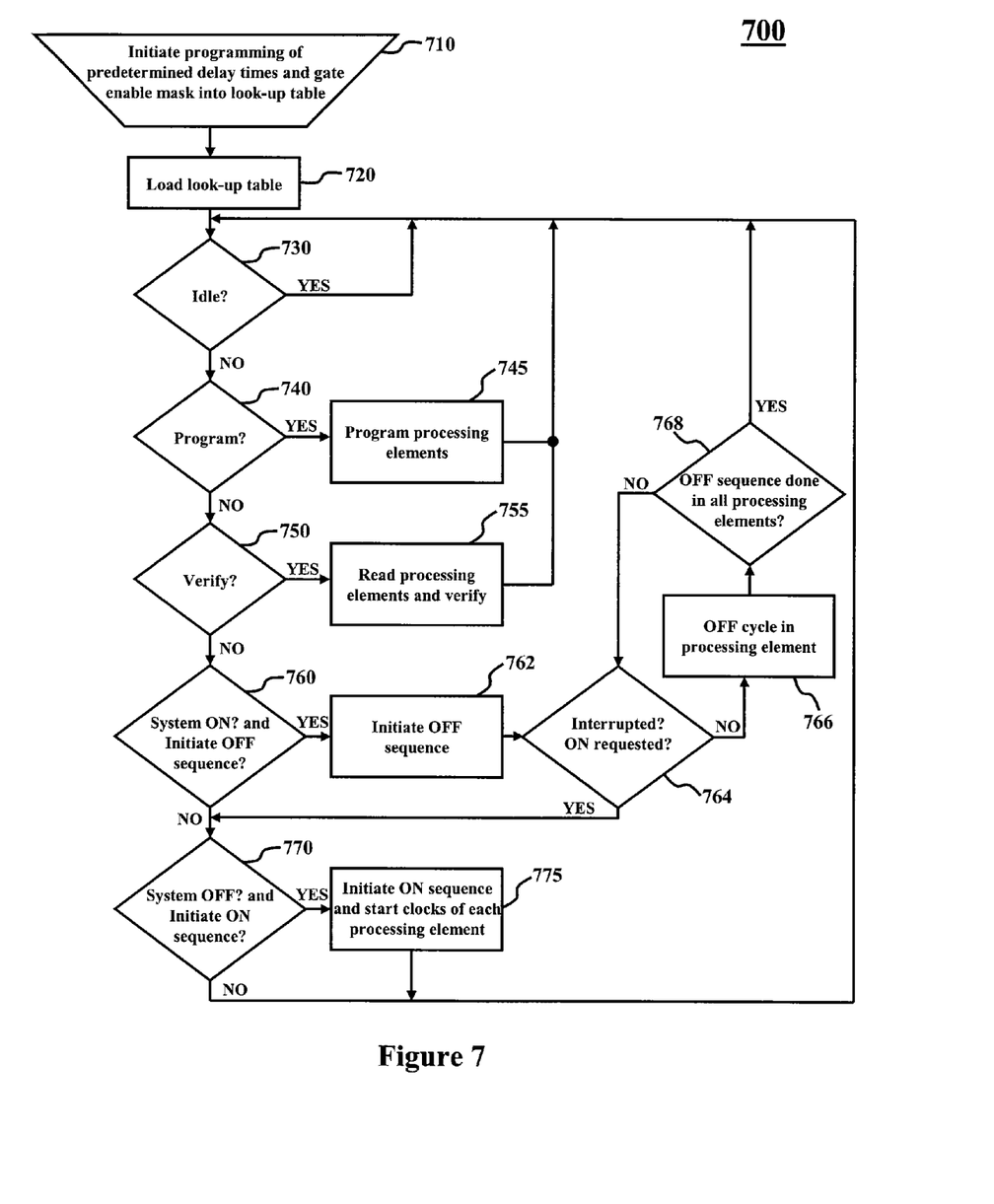
FIG. 7 is an example state machine flowchart that can be applied to an electronic system in which the present invention can be implemented.

In addition, state machine 310 (from FIG. 3) controls the processing elements in system 300 used to perform the graphics operation. FIG. 7 is an illustration of an example state machine flowchart 700 that can be applied by the state machine in system 300. In flowchart 700, a look-up table is used (see 710 and 720) by state machine 310 to store information on predetermined delay times and gate enable mask bits, where this information can be used by the processing elements during the graphics operation. For instance, the look-up table can store information relating to which processing elements in system 300 participate in the graphics operation, as well as information relating to an activation and de-activation sequence of the processing elements. A person skilled in the relevant art will recognize that other state machine flows can be applied used by system 300.

Prior to receiving data from an external source, system 600 is idle and, as such, system 300 is also idle to conserve power in the chip (see 730 in FIG. 7). After receiving data from an external source, input buffer 610 can initiate a graphics function by sending system 300 a "wake up" signal to start powering up. Techniques to wake up an idle system and wake up protocols in chip systems are known to those persons skilled in the relevant art.

In accordance with an embodiment of the present invention, state machine 310 in system 300 issues a control signal to the processing elements in system 300. The clock gate control signal of each processing element activates in a sequential and staggered manner according to a predetermined delay time programmed in each processing element (see 770 in FIG. 7). As such, a large amount of current is not drawn from a power grid in system 600 at one time. Once the processing elements have powered up, system 300 performs the graphics operation on the data received from input buffer 610. Upon completion of the graphics operation, system 300 sends the processed data to output buffer 620. Output buffer 620 then transfers the data off the chip for further processing.

Once the processed data is sent to output buffer 620, state machine 310 issues a control signal to the processing elements in system 300 to power down in order to reduce power consumption by system 600. Similar to power up, system 300 powers down in a sequential and staggered manner with the same delay times used in its activation (see 760 in FIG. 7). As such, a significantly reduced amount of current is drawn from the power grid of system 600 when the switching transistors (discussed above) transition from an active state to an idle state (e.g., transition '1' to '0'). Ultimately, this approach reduces the potential for missed timings and reduces failures in system 600.

Figure 8:
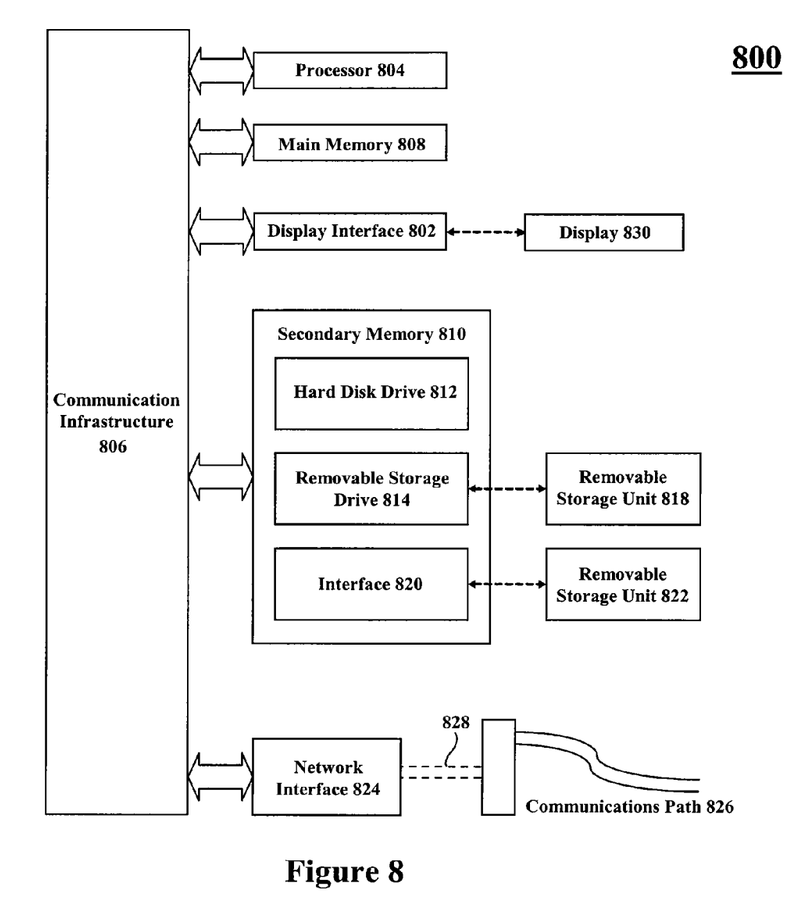
FIG. 8 is an illustration of an embodiment of a computer system in which the present invention can be implemented.

Various aspects of the present invention can be implemented by software, firmware, hardware (or hardware represented by software such as, for example, Verilog or hardware description language instructions), or a combination thereof. FIG. 8 is an illustration of an example computer system 800 in which the present invention, or portions thereof, can be implemented as computer-readable code. For example, the methods illustrated by flowchart 400 of FIG. 4 can be implemented in system 800. Various embodiments of the invention are described in terms of this example computer system 800. After reading this description, it will become apparent to a person skilled in the relevant art how to implement the invention using other computer systems and/or computer architectures.

It should be noted that the simulation, synthesis and/or manufacture of the various embodiments of this invention may be accomplished, in part, through the use of computer readable code, including general programming languages (such as C or C++), hardware description languages (HDL) such as, for example, Verilog HDL, VHDL, Altera HDL (AHDL), or other available programming and/or schematic capture tools (such as circuit capture tools). This computer readable code can be disposed in any known computer usable medium including a semiconductor, magnetic disk, optical disk (such as CD-ROM, DVD-ROM) and as a computer data signal embodied in a computer usable (e.g., readable) transmission medium (such as a carrier wave or any other medium such as, for example, digital, optical, or analog-based medium). As such, the code can be transmitted over communication networks including the Internet and internets. It is understood that the functions accomplished and/or structure provided by the systems and techniques described above can be represented in a core (such as a GPU core) that is embodied in program code and may be transformed to hardware as part of the production of integrated circuits.

Computer system 800 includes one or more processors, such as processor 804.

Processor 804 can be a special purpose or a general purpose processor. Processor 804 is connected to a communication infrastructure 806 (e.g., a bus or network).

Computer system 800 also includes a main memory 808, preferably random access memory (RAM), and can also include a secondary memory 810. Secondary memory 810 can include, for example, a hard disk drive 812, a removable storage drive 814, and/or a memory stick. Removable storage drive 814 can comprise a floppy disk drive, a magnetic tape drive, an optical disk drive, a flash memory, or the like. The removable storage drive 814 reads from and/or writes to a removable storage unit 818 in a well known manner. Removable storage unit 818 can comprise a floppy disk, magnetic tape, optical disk, etc. which is read by and written to by removable storage drive 814. As will be appreciated by persons skilled in the relevant art, removable storage unit 818 includes a computer-usable storage medium having stored therein computer software and/or data.

In alternative implementations, secondary memory 810 can include other similar devices for allowing computer programs or other instructions to be loaded into computer system 800. Such devices can include, for example, a removable storage unit 822 and an interface 820. Examples of such devices can include a program cartridge and cartridge interface (such as those found in video game devices), a removable memory chip (e.g., EPROM or PROM) and associated socket, and other removable storage units 822 and interfaces 820 which allow software and data to be transferred from the removable storage unit 822 to computer system 800.

Computer system 800 can also include a communications interface 824. Communications interface 824 allows software and data to be transferred between computer system 800 and external devices. Communications interface 824 can include a modem, a network interface (such as an Ethernet card), a communications port, a PCMCIA slot and card, or the like. Software and data transferred via communications interface 824 are in the form of signals which can be electronic, electromagnetic, optical, or other signals capable of being received by communications interface 824. These signals are provided to communications interface 824 via a communications path 826. Communications path 826 carries signals and can be implemented using wire or cable, fiber optics, a phone line, a cellular phone link, a RF link or other communications channels.

In this document, the terms "computer program medium" and "computer-usable medium" are used to generally refer to media such as removable storage unit 818, removable storage unit 822, and a hard disk installed in hard disk drive 812. Signals carried over communications path 826 can also embody the logic described herein. Computer program medium and computer-usable medium can also refer to memories, such as main memory 808 and secondary memory 810, which can be memory semiconductors (e.g., DRAMs, etc.). These computer program products are ways to provide software to computer system 800.

Computer programs (also called computer control logic) are stored in main memory 808 and/or secondary memory 810. Computer programs can also be received via communications interface 824. Such computer programs, when executed, enable computer system 800 to implement the present invention as discussed herein. In particular, the computer programs, when executed, enable processor 804 to implement the processes of the present invention, such as the steps in the methods illustrated by flowchart 400 of FIG. 4, discussed above. Accordingly, such computer programs represent controllers of the computer system 800. Where the invention is implemented using software, the software can be stored in a computer program product and loaded into computer system 800 using removable storage drive 814, interface 820, hard drive 812 or communications interface 824.

The invention is also directed to computer program products comprising software stored on any computer-usable medium. Such software, when executed in one or more data processing device, causes a data processing device(s) to operate as described herein. Embodiments of the invention employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

While various embodiments of the present invention have been described above, it should be understood that they have been presented by way of example only, and not limitation. It will be understood by those skilled in the relevant art that various changes in form and details can be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for controlling a clock distribution network in a digital system including a plurality of processing elements, comprising:

programming a predetermined delay time into the plurality of processing elements; and controlling activation and de-activation of the plurality of processing elements, comprising propagating control signals by a first sub-set of the plurality of processing elements to activate a second sub-set of the plurality of processing elements in a sequence based on the predetermined delay time.

2. The method of claim 1, wherein programming the predetermined delay time further comprises:

verifying the predetermined delay time in each processing element.

3. The method of claim 2, wherein verifying the predetermined delay time comprises reading a control register with the predetermined delay time.

4. The method of claim 1, wherein programming the predetermined delay time comprises programming the predetermined delay time in a control register of a clock gate control circuit within each of the processing elements.

5. The method of claim 1, wherein programming the predetermined delay time comprises multiplying a delay multiplier with a base constant to calculate an activation time and a de-activation time for each processing element, the delay multiplier and the base constant being stored in a control register of the processing element.

6. The method of claim 1, wherein controlling activation and de-activation comprises enabling a clock gate control circuit, in the processing element, when the system is active and disabling the clock gate control circuit when the system is idle.

7. The method of claim 1, wherein controlling activation and de-activation comprises controlling an activation and a de-activation of one or more processing elements with a state machine based on the system's mode of operation.

8. The method of claim 1, wherein controlling activation and de-activation comprises activating and de-activating the plurality of processing elements in a daisy-chain configuration, the activation and de-activation of the plurality of processing elements occurring in a sequential and staggered manner.

9. A computer program product comprising a computer readable storage device having computer program logic recorded thereon for enabling a processor to control a clock distribution network in a digital system including a plurality of processing elements, the computer program logic comprising:
a first computer readable program code that enables a processor to program a predetermined delay time into the plurality of processing elements; and
a second computer readable program code that enables a processor to control activation and de-activation of the plurality of processing elements, comprising propagating control signals by a first sub-set of the plurality of processing elements to activate a second sub-set of the plurality of processing elements in a sequence based on the predetermined delay time.

10. The computer program product of claim 9, the computer program logic further comprising:
a third computer readable program code that enables a processor to verify the predetermined delay time in each processing element.

11. The computer program product of claim 10, wherein the third computer readable program code comprises:
a fourth computer readable program code that enables a processor to ensure that the delay time was programmed correctly.

12. The computer program product of claim 9, wherein the first computer readable program code comprises:
a third computer readable program code that enables a processor to program the predetermined delay time in a control register of a clock gate control circuit within each of the processing elements.

13. The computer program product of claim 9, wherein the first computer readable program code comprises:
A third computer readable program code that enables a processor to multiply a delay multiplier with a base constant to calculate an activation time and a de-activation time for each processing element, the delay multiplier and the base constant being stored in a control register of the processing element.

14. The computer program product of claim 9, wherein the second computer readable program code comprises:
a third computer readable program code that enables a processor to enable a clock gate control circuit, in the processing element, when the system is active and disabling the clock gate control circuit when the system is idle.

15. The computer program product of claim 9, wherein the second computer readable program code comprises:
a third computer readable program code that enables a processor to control an activation and a de-activation of one or more processing elements with a state machine based on the system's mode of operation.

16. The computer program product of claim 9, wherein the second computer readable program code comprises:
a third computer readable program code that enables a processor to activate and de-activate the plurality of processing elements in a daisy-chain configuration, the activation and de-activation of the plurality of processing elements occurring in a sequential and staggered manner.

17. The computer program product of claim 9, wherein the computer program logic comprises instructions in a hardware description language.

18. A system for controlling a clock distribution network in a digital system including a plurality of processing elements, comprising:
a first hardware-based module to program a predetermined delay time into the plurality of processing elements; and
a second hardware-based module to control activation and de-activation of the plurality of processing elements, comprising propagating control signals by a first sub-set of the plurality of processing elements to activate a second sub-set of the plurality of processing elements in a sequence based on the predetermined delay time.

19. The system of claim 18, further comprising:
a third hardware-based module to verify the predetermined delay time in each processing element.

20. The system of claim 19, wherein the third module comprises:
a module to ensure that the delay time was programmed correctly.

21. The system of claim 18, wherein the first module comprises:
a module to program the predetermined delay time in a control register of a clock gate control circuit within each of the processing elements.

22. The system of claim 18, wherein the first module comprises:
a module to multiply a delay multiplier with a base constant to calculate an activation and a de-activation time for each processing element, the delay multiplier and the base constant being stored in a control register of the processing element.

23. The system of claim 18, wherein the second module comprises:
a module to enable a clock gate control circuit, in the processing element, when the system is active and disabling the clock gate control circuit when the system is idle.

24. The system of claim 18, wherein the second module comprises:
a module to control an activation and a de-activation of one or more processing elements with a state machine based on the system's mode of operation.

25. The system of claim 18, wherein the second module comprises:
a module to activate and de-activate the plurality of processing elements in a daisy-chain configuration, the activation and de-activation of the plurality of processing elements occurring is a sequential and staggered manner.

26. A method for controlling a clock distribution network in a digital system including a plurality of processing elements, comprising:
programming a predetermined delay time into the plurality of processing elements, wherein programming the predetermined delay time comprises multiplying a delay multiplier with a base constant to calculate an activation time and a de-activation time for each processing element, the delay multiplier and the base constant being stored in a control register of the processing element; and
controlling activation and de-activation of the plurality of processing elements in a sequence based on the predetermined delay time.

27. A system for controlling a clock distribution network in a digital system including a plurality of processing elements, comprising:
a first hardware-based module to program a predetermined delay time into the plurality of processing elements includes a module to multiply a delay multiplier with a base constant to calculate an activation and a de-activation time for each processing element, the delay multiplier and the base constant being stored in a control register of the processing element; and
a second hardware-based module to control activation and de-activation of the plurality of processing elements in a sequence based on the predetermined delay time.

* * * * *